United States Patent [19]
Gavlin et al.

[11] Patent Number: 5,334,291
[45] Date of Patent: Aug. 2, 1994

[54] ON-SITE, CONTROLLED WASTE CONCENTRATOR AND SOLVENT REGENERATOR APPARATUS

[75] Inventors: Gilbert Gavlin, Lincolnwood, Ill.; William M. Langdon, deceased, late of Green Valley, Ariz., by Nancy Langdon, legal representative; Boris Goltsin; Gunther Erlebacher, both of Skokie, Ill.; Douglas A. Larson, River Forest, Ill.

[73] Assignee: Safety-Kleen Corp., Elgin, Ill.

[21] Appl. No.: 89,691

[22] Filed: Jul. 9, 1993

[51] Int. Cl.⁵ .................. B01D 3/02; B01D 3/42
[52] U.S. Cl. .................. 202/234; 122/379; 122/406.1; 122/414; 159/29; 159/44; 159/901; 202/160; 202/170; 202/181; 202/206; 203/1; 203/2; 203/98; 203/100; 203/DIG. 11; 203/DIG. 18
[58] Field of Search .............. 202/234, 160, 206, 170, 202/153, 181, 267.1; 159/27.1, 28.1, 44, 901, 29; 203/1, 2, 100, 98, 86, DIG. 18, DIG. 25, DIG. 11; 122/379, 406.1, 414, 160, 451.1, 488, DIG. 13

[56] References Cited

U.S. PATENT DOCUMENTS

| | | | |
|---|---|---|---|
| 1,935,183 | 11/1933 | Hapgood | 196/15 |
| 1,973,426 | 9/1934 | Booth et al. | 87/6 |
| 2,475,482 | 7/1949 | Clemens | 202/194 |
| 2,849,386 | 8/1958 | Gilmore et al. | 202/153 |
| 3,070,463 | 12/1962 | Barday | 134/11 |
| 3,897,754 | 8/1975 | Verde | 122/33 |
| 4,204,913 | 5/1980 | Sabatka | 202/168 |
| 4,284,469 | 8/1981 | Ikura et al. | 159/901 |
| 4,289,586 | 9/1981 | Sabatka | 203/1 |
| 4,350,568 | 9/1982 | Dahysan | 202/267.1 |
| 4,357,212 | 11/1982 | Osterman et al. | 202/170 |
| 4,390,396 | 6/1983 | Koblenzer | 202/166 |
| 4,490,215 | 12/1984 | Bannon | 203/94 |
| 4,497,690 | 2/1985 | Manzone | 202/181 |
| 4,637,346 | 1/1987 | Draper et al. | 122/4 A |
| 4,660,510 | 4/1987 | Draper | 122/31.1 |
| 4,727,826 | 3/1988 | Draper et al. | 122/379 |
| 5,034,102 | 7/1991 | Rüdel | 202/153 |

Primary Examiner—Virginia Manoharan
Attorney, Agent, or Firm—Lockwood Alex FitzGibbon & Cummings

[57] ABSTRACT

An apparatus for removing non-volatile residues and impurities from a used solvent includes a self-scrubbing heating distillation subassembly for separating purified solvent for reuse and a controlled waste collector subassembly for overflowing concentrated residues and impurities stripped from the used solvent into an easy-to-service container. The apparatus may be disposed in a parallel in-line relationship with a circulating solvent flow circuit, such as in a dry cleaning operation, to continuously withdraw and purify aliquot portions of the circulating solvent stream, returning good solvent back to the flow circuit and concentrating non-volatile residues and impurities to a removable, environmentally sound serviceable container. The new and improved self-scrubbing heater assembly causes a rapid turbulent reboiling flow of solvent within a confined column and substantially avoids build up of residues on heat exchange surfaces for prolonged heater life and longer uninterrupted service life before service is needed.

11 Claims, 3 Drawing Sheets

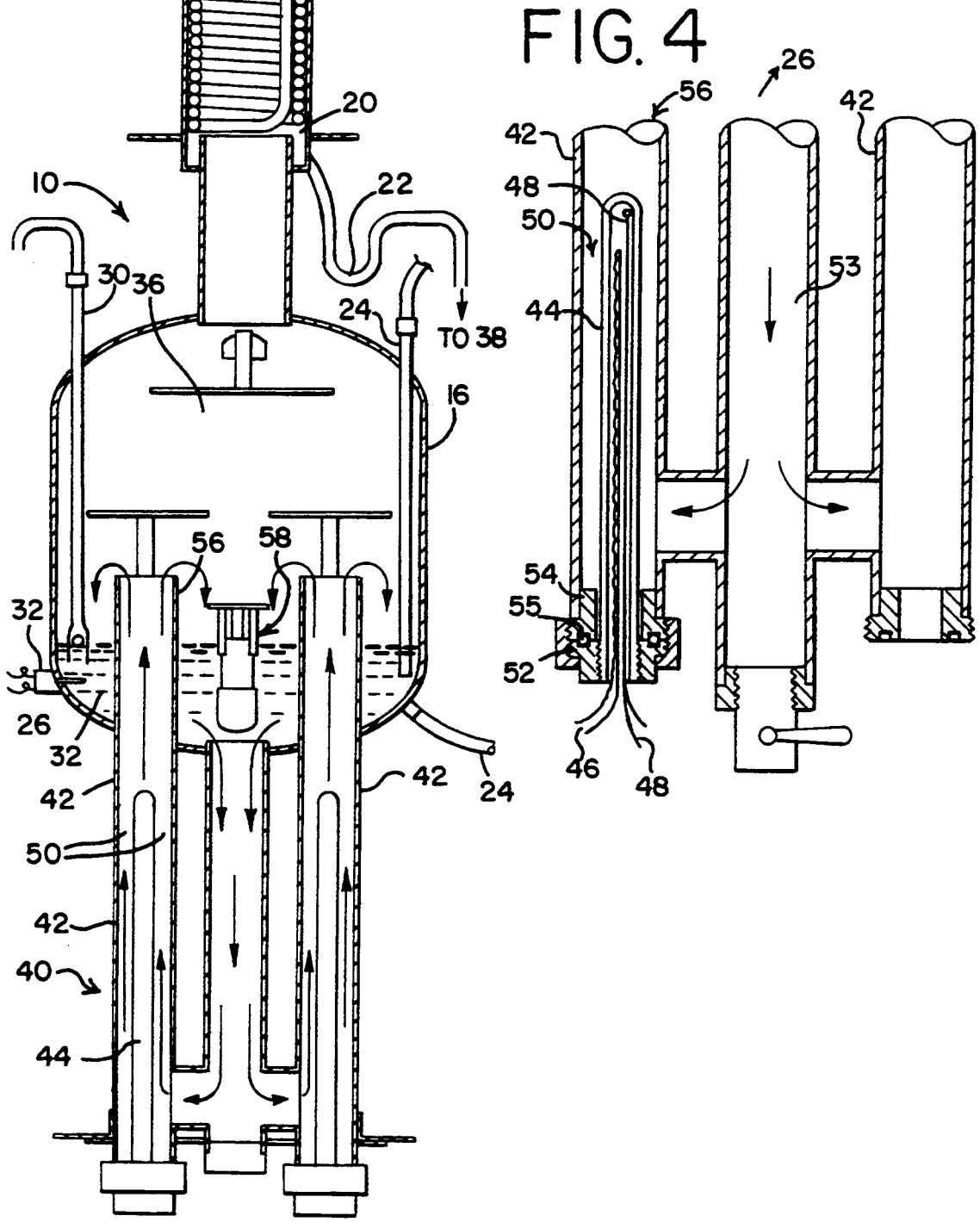

ON-SITE, CONTROLLED WASTE CONCENTRATOR AND SOLVENT REGENERATOR APPARATUS

BACKGROUND OF THE INVENTION

The present invention relates to recent improvements in the handling and utilization of potentially harmful substances, such as organic solvents, to improve environmental safety associated with their use. More particularly, it relates to a new and improved apparatus and method for removing residues and impurities from a circulating solvent flow circuit including a self-scrubbing thermosyphon distillation subassembly for separating purified solvent for return to the flow circuit and a controlled waste collector subassembly for overflowing concentrated residues and impurities into an easy-to-service container.

Recently, the number of kinds of organic solvents commercially employed in a variety of end use applications has increased. Hydrocarbons, halohydrocarbons, fluorocarbons and aromatic solvents are now employed in a number of cleaning applications. Dry cleaning operations for clothing, sometimes referred to as chemical cleaning in Europe, may be the most widespread use for organic solvents of this type. Other uses include cleaning operations for electronic equipment, e.g., refluxing of printed circuit boards. Moreover, various metal cleaning and parts washing apparatus employ special solvents. Some metal cleaning operations prepare surfaces to receive paint or other coatings. Alternatively, solvents may be used to soften and remove unwanted paint and coatings from various substrates such as, for example, in spray guns or other automatic painting equipment.

Concurrently, an awareness of the possibility of environmental damage caused by careless handling and disposal of these organic solvent materials has also increased. Concerns over contamination of ground water supplies caused by the leaking and spilling of used or contaminated solvent onto the ground has long been a concern. More recently, it has been suggested that uncontrolled release of some or all of these organic solvent vapors into the atmosphere may be harmful. Release of some materials may cause a health hazard by increasing the ozone content of the lower atmosphere. Other materials are believed to cause an increased degradation of the ozone layer in the upper atmosphere. Various chlorinated fluorocarbons have been seriously implicated in this regard and a reduction and eventual ban of their use has been recommended by international agreements, such as the Montreal Protocol. Additional health concerns have been noted with respect to the possible carcinogenicity of low molecular weight hydrocarbon and halo-hydrocarbon materials.

The environmental, health and safety concerns surrounding a common end use application for controlled organic solvents is well illustrated by the case of a small to moderately-sized commercial dry cleaning operation. In a commercial dry cleaning operation, customers clothes are collected at a storefront location. The clothes are washed in cleaning machines located on the premises or at a separate location. The clothes are tumbled in an amount of a cleaning solvent which is periodically circulated in batches into the cleaning machines from a reservoir. After agitation of the clothes in the presence of the fluid takes place, the cleaning fluid, usually 1,1,1-trichloroethane (prohibited as of 1995), tetrachloroethylene, or 1,1,2-trichloro-1,2,2-trifluoroethane (known as CFC-113 or Freon ®113 (DuPont)) is drained into a collecting basin associated with the clothes washing units. Additional fluid remaining on the clothes is extracted by spin cycling and this additional solvent is added to the collecting basin.

The used, collected cleaning solvent is then returned to the reservoir and is recycled and continuously used from the reservoir until it is time to replenish the solvent supply, in whole or in part. Frequently, during a portion of the dry cleaning solvent circulation cycle, the solvent may be subject to treatment for removal of solids or particulate matter, namely, lint, grit and the like by means of filters and for removal of water or the like by liquid separators.

In the course of repeatedly re-using the dry cleaning solvent, the solvent per se is not degraded or damaged but becomes contaminated with non-volatile residues and impurities of varying kinds. Normally, the kinds of impurities miscible with a cleaning solvents are oily residues from a number of sources, such as body fluids, air pollution and various foods and beverages. As the concentration of these non-volatile residues builds up in the solvent, the solvent becomes increasingly less effective at cleaning. Eventually, the entire batch of solvent must be removed containerized and transported to a recycling or disposal center.

At this point a number of disadvantages and environmental concerns may be identified. It is now well known that every effort should be made to reduce, reuse and recycle potentially harmful materials. Reuse of the solvents is currently practiced, but after a given level of contamination is reached, re-conditioning or replacement of the solvent is required. Recycling of the dry cleaning fluids however also presents special additional risk factors to be considered. During recycling care should be taken to reduce or eliminate the risk of spillage and/or of exposing volatile organic solvents to humans and the atmosphere. Removing the solvent from the dry cleaning circuit and placing it into containers for shipment to a treatment center introduces the added possibility for spillage and exposure to vapors. Furthermore, transporting the containers to a remote solvent reconditioning center increases the risk of spillage and exposure because of the risk of highway or rail accidents. For these reasons providing a controlled, on-site solvent regeneration system is clearly more desirable than shipping new solvent to a location and shipping used solvent away from the same location on a frequent basis.

Prior art equipment for separating re-usable solvent fractions from non-volatile residues and impurities introduced into the solvent during use have generally been based on distillation equipment and has not been altogether satisfactory. Prior art distillation equipment is generally involves heating with high pressure steam by means of a jacket located in a wall of the distillation vessel. Sometimes a tube bundle is used as a heat source. Frequently, a motor-driven agitator designed to scrape the walls is provided. The prior art scraper systems are generally ineffective to prevent deposition of resinous coatings on the heat transfer surfaces. Once deposition occurs, heat transfer is impeded or halted completely. At this point, it becomes necessary to dismantle the distillation equipment to permit the interior of the vessel to be scraped and cleaned exposing workers and the environment to chemical vapors.

Prior art batch stills usually comprise manually operated apparatus requiring undesirably high amounts of solvent handling. In the case of stills used for dry-cleaning solvents, direct heating without agitation is typical. In the hands of an unskilled operator with little or no distillation background, these stills are frequently operated at overheating temperatures. Overheating causes residue decomposition which may also produce and introduce secondary contaminants into the air or solvent which are possibly toxic. Moreover, overheating causes excess carry-over of residues resulting in unsatisfactory separations.

In one prior art still equipped with a wall scraping stirrer/agitator and adapted for solvent flow rates of as high as 500 gallons per hour, the heating surfaces become coated and ineffective after only about one hour.

In view of the failure of the prior art to provide effective devices and methods for providing environmentally-safe cleaning and regeneration/separation of re-usable solvent from non-volatile residues (NVRs) on the premises, it is an object of this invention to provide improved apparatus and methods for accomplishing on the premises cleaning and regeneration/separation of re-usable solvent from non-volatile residues (NVRs).

It is another object of this invention to provide a new and improved still apparatus for concentrating NVRs and other impurities for batch collection and removal in easy-to-service containers.

It is a further object of the present invention to provide a new and improved apparatus for regenerating clean solvent including a self-scrubbing thermosyphoning heat transfer assembly which does not become dirty and retains its heat transfer efficiency, even after prolonged periods of continuous operation and even when exposed to NVR concentrations in excess of 40%.

It is still another object of the present invention to provide a new and improved solvent distillation apparatus adapted to be placed in a parallel in-line relationship with a circulating solvent stream to extend the useful life of a given quantity of solvent cycling through the solvent stream on the premises of use.

It is a further object of the present invention to provide an on-the-premises solvent recovery distillation plant employing a new and improved self-cleaning heating system which may be maintained without disturbing the remaining portions of the distillation apparatus to reduce or eliminate exposure of personnel to chemicals.

It is still another object of the present invention to provide an apparatus and method for conducting solvent distillation under conditions mild enough to avoid decomposition of solvent and solvent contents, so that non-volatile residues and impurities stripped from the solvent may be recovered intact, should. The NVRs be known or discovered to be separately useful or reusable.

SUMMARY OF THE INVENTION

In accordance with these and other objects, the present invention provides a new and improved apparatus for controlled, on-site concentration and removal of non-volatile residues and other impurities from a circulating solvent stream in an end use flow circuit for said solvent. The new and improved apparatus of the invention comprises a generally hollow vessel defining a fluid-receiving chamber. The fluid receiving chamber within the still vessel includes an upper vapor-receiving portion and a lower liquid-receiving sump portion. The lower sump portion has an associated maximum liquid level fill height generally defined by an overflow exit port and optionally but preferably, also has a minimum liquid fill height determined generally by the placement and position of a liquid level sensor. A dirty or contaminated solvent entry port is provided in said vessel disposed below the minimum liquid fill height.

The apparatus additionally comprises a condenser subassembly mounted to said vessel adjacent an upper end thereof having an inner cooling channel disposed in fluid flow communication with the upper vapor-receiving portion. The condenser subassembly includes means for collecting an evaporated, decontaminated solvent fraction in liquid form as it is condensed along the cooling channel surfaces and for returning the collected liquid, i.e., reclaimed, solvent fraction to the circulating solvent stream.

In accordance with the invention, the new and improved apparatus further comprises a thermosyphon heat transfer subassembly. The heat transfer subassembly includes an elongate, vertically oriented heating tube having an upper end with a discharge opening, and an opposed lower end with a heater rod-receiving opening. A solvent entry aperture is also defined in the heating tube adjacent the lower end.

The thermosyphon heat transfer subassembly further includes an elongate heater rod having a lower end with a base mounting portion and an opposed upper free end. The heater rod is mounted to the heating tube so that the free end of the rod is telescopically and coaxially received in said tube with the base mounting portion sealably, mountedly engaged in the rod-receiving opening. The heater rod has an outer diametrical dimension which is less than the inner diameter of the heater tube to thereby define a generally narrow annular heat transfer region therebetween.

The thermosyphoning heat transfer subassembly is mounted to a lower end of the vessel so that the lower end of heating tube extends below the vessel and the upper end of heating tube extends through the bottom of the vessel in sealed relation therewith. The upper end of the heating tube is positioned so that its discharge opening is disposed in the fluid receiving chamber at a point above the maximum liquid fill height.

The apparatus additionally includes means for providing fluid flow connection between the lower sump portion of the vessel and the solvent entry aperture communicating with the annular heat transfer region. Pump means are also provided for introducing contaminated solvent from the circulating solvent stream in said end use solvent circuit to the contaminated solvent entry port defined in the lower portion of the vessel.

Finally, the new and improved apparatus includes means for interactively automatically controlling operation of the distillation operation, including means for sensing overflow volume, an on/off heater power switch, means for sensing temperature, means for sensing a lower liquid level and means for supplying cold water to said condenser.

Generally, after an initial start up sequence, the heater switch in its on position or condition causes rapid reboiling and thermosyphoning liquid flow of the dirty solvent from the sump portion, through the heating region and out the upper discharge end of the tube. Movement of the contaminated solvent along the annular heat transfer space causes vaporization of the exiting solvent. Heated solvent vapor travels upwardly into the condenser cooling chamber where it condenses to form droplets of purified liquid solvent along the chilled surfaces of the cooling channel. An undercut collection trough receives the dripping condensate and routes it for return to the circulating solvent stream.

Gradually the liquid level of contaminated solvent in the sump portion falls due to the evaporation and removal of pure solvent condensate. Concurrently, the temperature of the re-boiling sump liquid gradually increases with each pass through the heat transfer zone. If either of two conditions are satisfied, namely that the liquid level drops to the minimum fill height or that the sump liquid temperature reaches a predetermined upper temperature value, the interactive controller turns on the pump to introduce a new amount of relatively colder dirty solvent into the sump portion. Fresh dirty solvent is added to the bottom of the sump portion until the temperature of the body of liquid has been reduced a predetermined number of degrees. Normally, in the course of this process there will be overflow from the top of the sump portion.

If the controller senses that the condenser cool water flow is impeded, the heater rod power switch is turned off.

The present invention is directed to a method and apparatus which extends the use life of a given quantity of dry cleaning or other solvent. The invention is concerned with a novel still apparatus which may be placed in parallel with the portions of the solvent cycle circulation loop. The apparatus periodically withdraws a portion of the being-used solvent, subjects it to a still separation or evaporative cleaning operation and returns the clean portion of the solvent to the solvent supply as a whole. As this process continues, the concentration of the contaminated solvent in the liquid section of the still continues to increase in the contaminated or nonvolatile residue (NVR) portion. After a significant amount of clean solvent is created through the evaporative and cleaning recollection, the collected concentrated nonvolatile residues may be drained or overflowed to a controlled waste container as the still vessel is refilled and the sequence of operation continues. The solvent regeneration may be performed as continuous batch sequence operation wherein successive quantities of solvent are introduced and separated into a clean solvent fraction and a concentrated NVR contaminant fraction.

According to the present invention, vertical flow tubes providing in effect a cylindrical column of liquid surrounding upwardly extending heater rod electrodes provides a circulation pattern which ensures rapid turbulent travel of the solvent past the surfaces of the heating element or elements. This action has been found effective to reduce or eliminate deposition of solid materials on heater surfaces. This reduction in residue build up on the heater surfaces in turn promotes better and extended heat transfer, improved recirculation and more orderly boiling action. By concentrating the non-volatile residues in the still, and continually supplying a clean solvent to the solvent supply, the supply is kept clean for an extended time.

Other objects and advantages of the present invention will become apparent from the following detailed description of the invention taken in conjunction with the drawings, in which:

BRIEF DESCRIPTION OF THE DRAWINGS

FIG. 3 is an elevated vertical cross-sectional view of the new and improved apparatus of the invention taken along view lines 3—3 in FIG. 2; and FIG. 4 is an enlarged, elevated cross-sectional view of the new and improved thermosyphon heating subassembly of the present invention.

DETAILED DESCRIPTION OF THE PREFERRED EMBODIMENT

Figure 1:
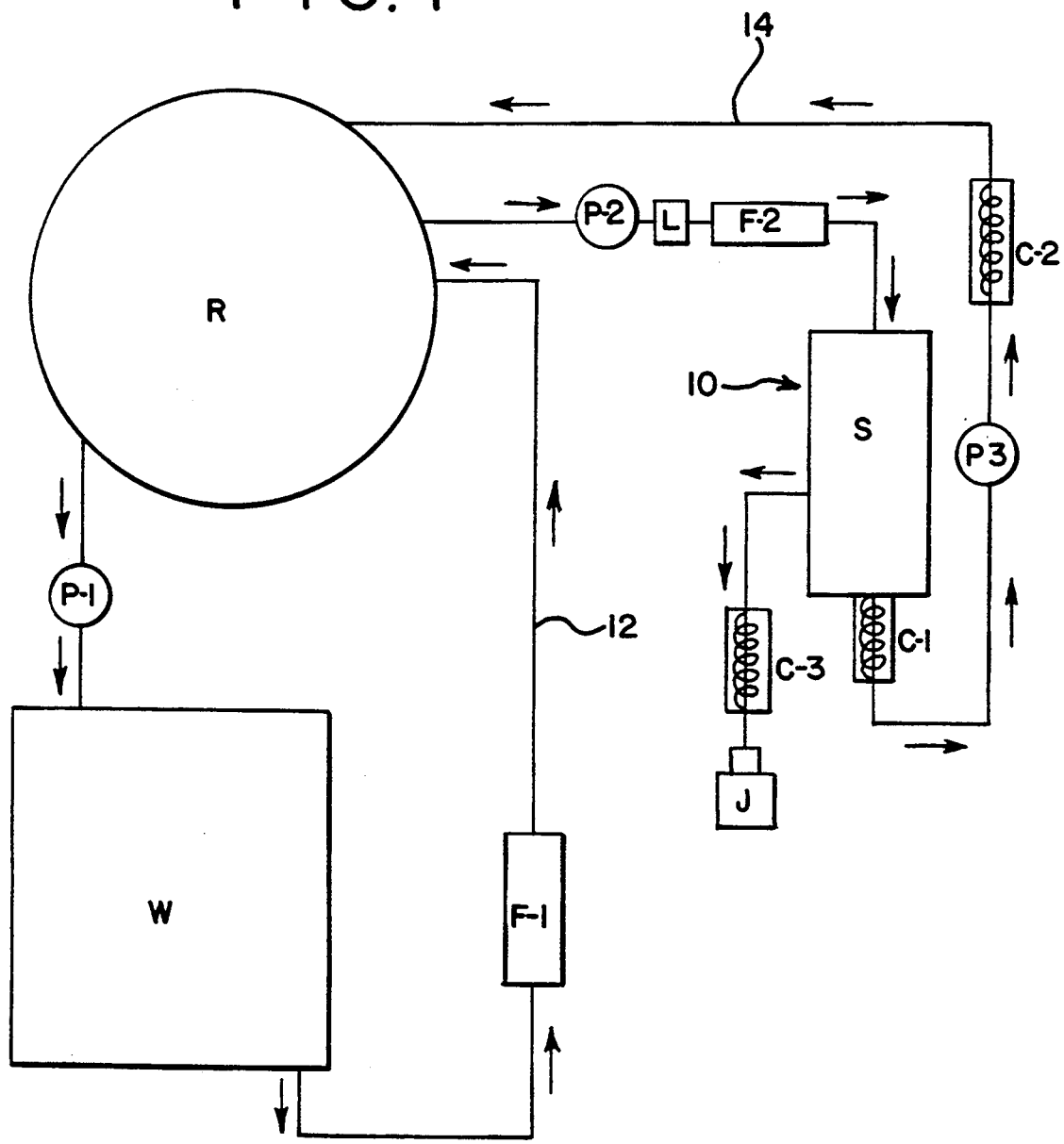
FIG. 1. is a schematic plan view of a dry cleaning circuit of operation incorporating the new and improved parallel in line controlled waste concentrator and solvent regenerator apparatus of this invention.

FIG. 1 is a schematic diagram depicting the use of the new and improved waste concentrator/solvent regenerator apparatus 10 of this invention shown in use installed in a parallel in-line relationship to a looped, cyclic dry cleaning solvent circuit 12. Dry cleaning solvent circuit or loop 12 includes a reservoir, R, for holding an excess supply of dry cleaning fluid which may contain an organic solvent such as 1,1,1-trichloroethane, or tetrachloroethylene, as well as, non-volatile residues (NVRs) and other impurities such as detergents and previously removed soils, spots and/or stains. Typically, the circulating dry cleaning solvent travelling around dry cleaning solvent circuit loop 12 a water emulsion containing about 1½% by weight NVRs. This circulating solvent fluid, frequently referred to as perk, has a boiling temperature range which varies depending on the concentration of NVRs present. Substantially purified solvent may vaporize or boil at a temperature of about 247° F., whereas contaminated solvent has a boiling range above that temperature, e.g., at about 40% by weight NVRs the contaminated solvent generally boils at a temperature of about 270° F.

As shown in FIG. 1, dry cleaning solvent circuit loop 12 includes a first pump, P-1, for causing solvent to flow from a lower portion of reservoir R into washing machine, W, wherein dirty clothes are tumbled in dry cleaning solvent to clean the garments. After a washing cycle has been completed, the used solvent exits from the machine drains and passes through a lint trap and/or fiber filter, F-1. After filtering, the used and filtered solvent is returned to reservoir, R, for recycling and re-use.

The new and improved apparatus 10 of this invention comprises a part of a parallel, in-line solvent flow circuit or loop 14. As depicted in FIG. 1, parallel loop 14 includes a flow circuit wherein solvent from reservoir, R, is pumped by a pump, P-1, through an in-line filter, F-1, such as a gasoline type fuel filter. Filter F-1 may be a 10 inch long, 30 micron cotton wound filter which may be used alone but preferably is used in combination with a lint screen filter, F-2, disposed upstream of filter F-1. The lint screen, F-2, and filter, F-1, should be generally effective to substantially remove all clothing fibers from the being-pumped dirty solvent stream prior to its introduction into the thermosyphon evaporation purification unit or still, S.

In accordance with this invention, the dirty solvent enters still S and is treated by a thermosyphoning distillation method which separates purified evaporated solvent from a more concentrated NVR solution fraction. Evaporated solvent is condensed and collected in a first cooling condenser, $C_1$, before being pumped by a pump, P-2, through a second cooling heat exchanger unit, $C_2$, for return to reservoir, R. Concentrated NVRs are overflowed from still, S, in accordance with this invention, through another cooling heat exchanger, $C_3$, and into an exit line having a sealed and engaged NVR concentrate removal jug, J, mounted thereon. The parallel, in-line solvent flow circuits 12 and 14 provide a controlled, on-site apparatus and method for reducing, reusing and recycling potentially harmful solvent chemicals. The NVRs are concentrated from about 1½% by weight to about 20%–40% by weight and the NVR rich small volume is stored in an easy to service container for disposal or further processing.

In accordance with the arrangement illustrated in FIG. 1, the volumes of newly regenerated solvent being transported to the dry cleaning location and the volumes of regulated used organic solvent materials transported away from the location may be dramatically reduced. Although, the new and improved self-cleaning single stage distillation apparatus and loop 14 are described in use with a dry cleaning solvent circuit loop 12, the apparatus may also be used with other primary solvent flow circuits, such as a printed circuit board reflux/washing apparatus or a parts washer/cleaner apparatus.

Figure 2:
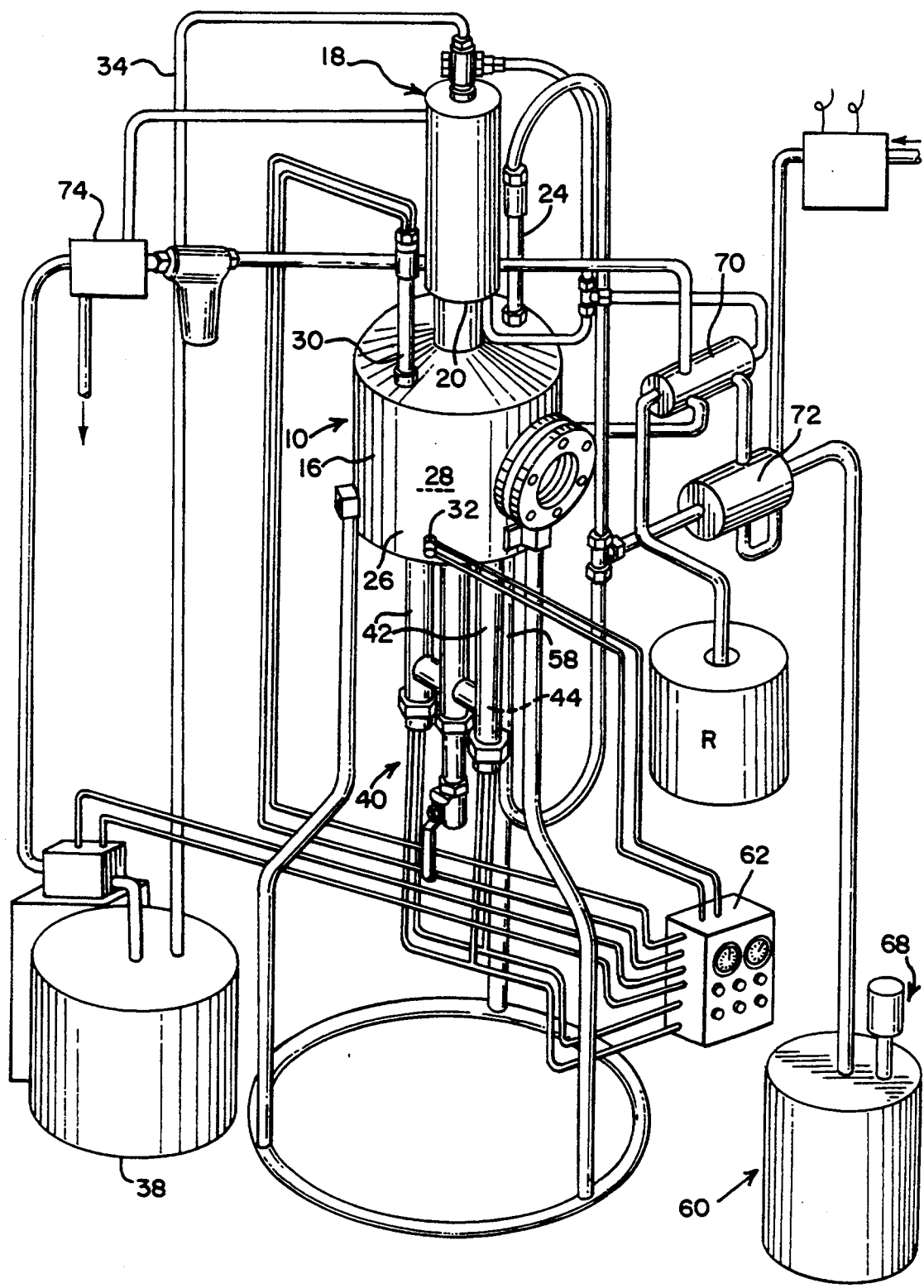
FIG. 2 is a perspective view of the new and improved apparatus of this invention.

Referring now to FIGS. 2-4, the new and improved distillation and waste concentrator apparatus 10 (indicated as distillation apparatus S in FIG. 1) is shown in greater detail. The new and improved apparatus 10 of the invention comprises a modified distillation apparatus including a small closed vessel 16 typically with a diameter to height ratio of 1:2 having a total volume of perhaps twice the hourly feed rate. In the case of the dry cleaning solvent recovery application depicted therein, the dry cleaning solvent used is normally tetrachloroethylene and the volume of vessel 16 may be from about five to six gallons.

A vertical reflux condenser subassembly 18 attached to the upper end of vessel 16 and is designed so that condensed vapors are caught in a gutter 20 and exit the vessel through a u-tube vapor seal 22. Dirty solvent feed enters the vessel 16 through a tube 24 extending down through the top of vessel 16 into the interior chamber 28 and sump portion 26 of vessel 16 to assist in rapid mixing and to prevent accidental draining of the vessel. The interior fluid receiving chamber 28 of the vessel 16 contains a standard mechanical level control 30 designed to sense and maintain the solvent at a predetermined minimal fill height. A thermocouple 32 for sensing and monitoring the liquid temperature is also provided. Vapor relief 34 is provided at the top of the condenser subassembly 18 and connected to the vapor space 36 of a product storage tank 38. All equipment is preferably constructed of stainless steel to assure cleanliness.

In accordance with the present invention, the new and improved apparatus 10 includes a new and improved self-scrubbing heater subassembly 40. Heater subassembly 40 is designed so that solvent liquid, P, is confined in a tube 42 or part thereof, while being heated. The annular confinement and heating space of the heater design causes a rapid circulation of a mixture of boiling liquid and vapor. It has now been discovered that this circulation can be made rapid enough to preclude formation of coatings on the surface of heater rods 44 even when the boiling liquid is very dirty.

In accordance with this aspect of the invention, self-scrubbing heating subassembly 40 includes a concentric tube design, having a central heater rod 44 containing the heater element 46 and a thermocouple 48 insulated from each other within an outer tube 44. In the preferred embodiment depicted in FIGS. 3-4, the heater rod 44 is about one inch in diameter and the outer tube 42 is about two inches resulting in an annular heating space 50 of about one-half inch. Two heating subassembly units 40 may be mounted vertically and arranged symmetrically in the distillation vessel extending through the bottom of the vessel. Each of the annular heating spaces 50 was connected to the sump portion 26 of the vessel 16 by solvent feed tubes so that smooth flow of liquid could take place. The heater rod 44 was welded to the male half 52 of an O-ring union with the female half 54 welded to the wall of the heating tube 42. In use the heater O-ring union may be operated hand tight.

For maintenance purposes, with the still vessel 16 in an empty condition, the entire heater assembly 40 may be easily removed to present the entire heat-transfer surface. We have discovered that with a power density of about 2000 to 5000 watts per heating rod 44, for example, a high speed flow of boiling liquid and vapor of tetrachloroethylene can be achieved. The annular heating space 50 should be long enough to provide a mixture of liquid and gaseous solvent at the boiling point of the solvent at the exit or discharge end 56. An apparatus in accordance with this invention may be used for example under these conditions for a period of about eight hours per day for several years without formation of a coating on the exchange surfaces of heater rods 44. This is true even though concentrated dry cleaning NVRs and impurities, when isolated from still-bottoms, are rubbery, sticky materials that are expected to readily form coatings.

The top or upper ends 56 of the heating tubes 42 are disposed at about the mid-point of the height of the still vessel 16. The mechanical level control 30 is set for a liquid level about one-half inch below the top opening of the thermal syphon tubes 42. The concentrated still bottoms or NVRs are discharged by gravity flow through an adjustable overflow port 58. The overflow level is set for about one inch above the top of the heater rods 44 in their fully installed positions.

The NVRs must be and are completely soluble in the dry cleaning solvent. Large particulates have been previously separated by the filter F before dirty feed enters the still vessel 16. The boiling temperature of the solution is a function of NVR content. NVR content control is accomplished by means of the thermocouple temperature sensor 48 that is used to maintain the discharge control temperature. Pure tetrachloroethylene has a boiling point of about 247° F., whereas the same solvent containing about 40% NVRs, has a boiling point of about 265°–272° F. Information provided by the thermocouple temperature sensor is employed in a controller operation to turn the dirty solvent pump on and off. Incoming dirty solvent lowers the temperature of the still bottoms and incoming replacement volume causes the concentrated NVR solution to overflow out of overflow port 58 into the NVR storage container 60. Dirty-feed normally has an NVR content of 1 to 1.5 percent. The heaters, set for a specific rate of distillation, are turned on at start-up and left on for the duration of the processing. At solvent temperatures below the discharge control temperature (DCT), the mechanical level control 30 keeps the liquid level below the overflow level within a 1.5 inch span by turning the feed pump off at the upper level and turning it on at the lower level. When the discharge control temperature is reached, a system control 62 turns on the dirty solvent pump and overrides the mechanical level control 30 allowing the dirty solvent feed to be fed into the bottom of the sump until the boiling temperature is depressed usually 7° to 10° F. below the discharge temperature. If the added volume is sufficient to cause overflow, then that overflow is directed to the still bottoms container 60. If not, the level control circuit takes over until the discharge control temperature is again reached and the cycle is repeated.

As distillation proceeds, a steady state is reached with distillation, addition of feed, and discharge of the still bottoms at the pre-determined final NVR content occurring at a substantially uniform or constant rate, dependent upon the heater setting.

Thermal efficiency and reduced energy consumption are achieved by using heat exchangers 70 and 72 to exchange the heat from the distillate and still bottoms to pre-heat the incoming dirty solvent.

The apparatus of this invention is preferably a closed system with all the containers vented to each other. As shown in FIG. 2, the distillate storage tank is vented to the still vessel 16 and the waste NVR concentrate vessel 60 is vented to the atmosphere through a carbon filter 68.

Although the present invention has been described with reference to certain preferred embodiments, modifications or changes may be made therein by those skilled in this art without departing from the scope and spirit of the present invention as defined in the appended claims.

What is claimed is:

1. An apparatus for controlled, on-site distillation and removal of non-volatile residues and impurities from a circulating solvent stream in an end use flow circuit for said solvent, said apparatus comprising:
    a generally hollow vessel defining a fluid-receiving chamber including an upper vapor-receiving portion and a lower liquid-receiving stamp portion, said lower sump portion having an associated maximum liquid fill height, an associated minimum liquid fill height and a contaminated solvent entry port disposed below the minimum fill height;
    means for condensing solvent vapors into liquid form solvent disposed in fluid flow communication with said vapor-receiving portion, said condensing means including means for collecting liquid form solvent and for returning a liquid form solvent fraction to the circulating solvent stream;
    a self-scrubbing heat transfer assembly including an elongate, vertically-oriented heating tube having a lower end with a heater rod-receiving opening and an opposed upper end with a discharge opening, and an elongate heater rod having a lower end with a base mounting portion and an opposed upper free end, said heater rod being mounted to said heating tube so that said base mounting portion is releasably, sealingly, mountedly engaged in the rod-receiving opening and the free end of the heater rod is telescopically and generally coaxially received in said heating tube, said heater rod having an outer diameter which is less than an inner diameter of said heating tube thereby defining an annular heat transfer region between the heating tube and the heater rod, means for fluidly connecting said discharge opening to said upper vapor-receiving portion, means for connecting said lower sump portion of said chamber to a lower end portion of said annular heat transfer region, means for introducing contaminated solvent from said circulating solvent stream in said end use flow circuit to said contaminated solvent entry port, means for sensing overflow volume to a waste container, means for sensing when the liquid level in the lower sump portion is at or below said minimum liquid level fill height, means for monitoring the temperature of the liquid in the lower sump portion, means for interactively controlling operation of the apparatus by monitoring the temperature of the circulating liquid form solvent in the sump portion until a pre-determined maximum high temperature value is reached, whereupon a controller is operative to cause the introducing means to introduce: new contaminated solvent into said lower sump portion to decrease the temperature of the sump liquid and simultaneously overflow a controlled volume of concentrated non-volatile residues and impurities through an overflow exit port into said waste container, until a maximum waste container volume has been reached, said controller further including means for controlling the heater rod to turn said heater rod from an "on" condition to an "off" condition when a maximum waste container volume has been reached or exceeded, when cold water supply to said condenser is interrupted, and when a minimum liquid fill level sensor indicates that the liquid level has dropped below said minimum fill level.

2. An apparatus as defined in claim 1, wherein said heat transfer assembly is mounted to a lower end of said vessel such that the lower end of the heating tube is disposed below the vessel and the upper discharge end of the heating tube extends within the vessel in sealed relation therewith so that the discharge opening is positioned in the fluid-receiving chamber at a point located above the maximum liquid level fill height.

3. An apparatus as defined in claim 1, wherein outer heat exchange surfaces on said heater rod comprise stainless steel.

4. An apparatus as defined in claim 3, wherein inner surfaces defined along the heating tube comprise stainless steel.

5. An apparatus as defined in claim 3, wherein said heater rod has a power input in kilowatts sufficient to provide the desired rate of distillation.

6. An apparatus as defined in claim 5, wherein said heat transfer assembly comprises a nickel chrome heating element.

7. An apparatus as defined in claim 1, wherein the ratio of the inner diameter of the heating tube to the outer diameter of the heater rod is from about 5:1 to about 1.05:1.

8. An apparatus as defined in claim 1, wherein the solvent flow rate through said annular heat transfer region is sufficiently rapid so as to prevent build up of residues on the heater rod surfaces.

9. An apparatus as defined in claim 8, wherein the solvent flow rate through said annular heat transfer region is from about 0.1 to about 25 gallons per second.

10. An apparatus as defined in claim 1, wherein the length of said heat transfer region is selected for a given heater rod power and temperature setting to provide a mixture of vapor form and liquid form materials substantially at the boiling point of the solvent feed exiting from the discharge end of the tube.

11. An apparatus as defined in claim 1, wherein said condenser means further including a hollow cylindrical condenser body having a helically wrapped hollow tube lining interior wall surfaces thereof, said hollow tube including an entrance portion and an exit portion and receiving a flow of cooling heat exchange medium therethrough, a cooling channel being defined inside of the hollow tube lining and being bounded thereby, and an inwardly projecting collecting portion extending generally perpendicularly inwardly from said condenser body generally below said hollow tube lining and extending inwardly beyond the cooling surfaces of said tube lining so as to receive and collect droplets of condensed liquid form solvent for return to said circulating solvent stream.

* * * * *